E. LAMBKIN.
Double-Acting Lever.
No. 223,928. Patented Jan. 27, 1880.
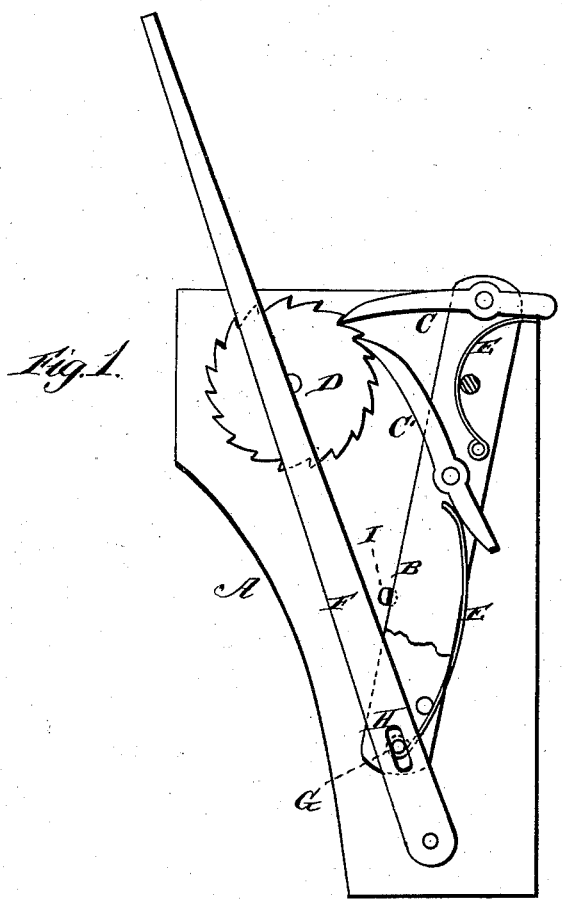
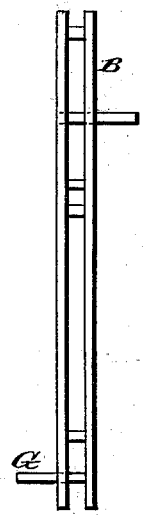
WITNESSES
Robert Everett
Chas. G. Page.
INVENTOR,
Edwin Lambkin.
Gilmore, Smith & Co.,
ATTORNEYS
N. PETERS, PHOTO-LITHOGRAPHER, WASHINGTON, D. C.

UNITED STATES PATENT OFFICE.

EDWIN LAMBKIN, OF CAN, MICHIGAN.

DOUBLE-ACTING LEVER.

SPECIFICATION forming part of Letters Patent No. 223,928, dated January 27, 1880.

Application filed December 13, 1879.

*To all whom it may concern:*

Be it known that I, EDWIN LAMBKIN, of Can, in the county of Huron and State of Michigan, have invented certain new and useful Improvements in Double-Acting Levers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my double-acting lever, and Fig. 2 is an edge view.

The nature of my present invention relates to a compound double-acting lever for extracting stumps, turning the windlass of a vessel, and for numerous other purposes where great power is required, as will be fully set forth in the following description, and particularly pointed out in the claim.

Referring by letter to the annexed drawings, A designates a strong plate or frame, upon which is pivoted a lever, B, either slotted from end to end, or, as herein illustrated, composed of two bars rigidly connected together so as to leave an intermediate space for the two pivoted pawls C C'. These pawls are pivoted at opposite sides of the fulcral point of the lever B, and converge toward a ratchet-wheel, D, with which they are held in constant engagement by means of springs E E.

Upon the plate or frame A, at a point somewhat beyond the end of the long arm of lever B, is pivoted a long lever-bar, F, which subserves the purpose of a handle for operating the mechanism. These two levers are connected at the end of the long arm of lever B by means of a pin and slot, G H, so that the two may be operated as a knee-lever, in which the ratio of the power to the weight or load will be compounded of the ratios subsisting between the arms of each lever.

Fig. 1 represents the position of the pawls and levers when power is not applied to the operating lever-bar F, and in this state the pawls will engage with adjacent teeth of the ratchet-wheel and be maintained against the same by reason of the spring-pressure, which likewise forces the long arm of lever B against a stop, I, upon the main plate or frame. If power is now applied and the lever F reciprocated away from the ratchet-wheel, the lever B will be turned upon its fulcrum, so as to cause the pawl C upon its short arm to force the ratchet-wheel around the distance between two of its teeth, and at the same time to retract the pawl C' upon its long arm, so that the said pawl will drop back a tooth upon the ratchet. As the lever F is reciprocated back again the pawl C' now acts upon the ratchet so as to give it a partial rotation, and the pawl C drops back a tooth, so that when the lever B strikes against the stop the pawls will assume the position shown in Fig. 1.

It is of course not essential that the pawls ride over but one tooth of the ratchet at a time, or force it around only the distance between two teeth, since it is evident that at each stroke of the lever the pawls may alternately force the wheel round the distance between two or more teeth and ride over a corresponding number.

The axle of the ratchet-wheel will be extended so as to form a windlass upon which a rope may be wound, or it may be connected with any desired gearing adapted for the purpose of operating any suitable machine.

What I claim, and desire to secure by Letters Patent, is—

The levers B and F, connected together by a slot and pin, and the spring-pawls C C', pivoted to the lever B, and arranged to engage with a ratchet-wheel, the said members being constructed and combined for operation substantially as herein shown and described, and for the purposes specified.

In testimony that I claim the above I have hereunto subscribed my name in the presence of two witnesses.

EDWIN LAMBKIN.

Witnesses:
RICHARD MARTINI,
FRANCIS SCHICKLING.